United States Patent
Côté et al.

(10) Patent No.: US 7,129,962 B1
(45) Date of Patent: Oct. 31, 2006

(54) EFFICIENT VIDEO PROCESSING METHOD AND SYSTEM

(75) Inventors: Jean-François Côté, Boucherville (CA); Jean-Jacques Ostiguy, Montreal (CA)

(73) Assignee: Matrox Graphics Inc., Dorval (CA)

( * ) Notice: Subject to any disclaimer, the term of this patent is extended or adjusted under 35 U.S.C. 154(b) by 149 days.

(21) Appl. No.: 10/104,011

(22) Filed: Mar. 25, 2002

(51) Int. Cl.
*G09G 5/02* (2006.01)

(52) U.S. Cl. ...................... 345/643; 382/239

(58) Field of Classification Search ............... 345/643; 348/250; 382/239
See application file for complete search history.

(56) References Cited

U.S. PATENT DOCUMENTS

| | | | | |
|---|---|---|---|---|
| 4,176,684 A * | 12/1979 | Kelso et al. | ................. | 137/562 |
| 4,196,448 A * | 4/1980 | Whitehouse et al. | .... | 348/400.1 |
| 4,348,186 A * | 9/1982 | Harvey et al. | ................. | 434/44 |
| 4,479,784 A * | 10/1984 | Mallinson et al. | ............. | 434/43 |
| 4,588,382 A * | 5/1986 | Peters | ......................... | 434/44 |
| 4,634,384 A * | 1/1987 | Neves et al. | ................... | 434/44 |
| 5,136,401 A * | 8/1992 | Yamamoto et al. | ......... | 358/474 |
| 5,137,450 A * | 8/1992 | Thomas | ....................... | 434/44 |
| 5,242,306 A * | 9/1993 | Fisher | ......................... | 434/44 |
| 5,278,646 A * | 1/1994 | Civanlar et al. | ........ | 375/240.25 |
| 5,487,665 A * | 1/1996 | Lechner et al. | ................ | 434/44 |
| 5,726,671 A * | 3/1998 | Ansley et al. | ............... | 320/119 |
| 5,748,770 A * | 5/1998 | Hajjahmad et al. | ......... | 382/167 |
| 6,196,845 B1 * | 3/2001 | Streid | ........................... | 434/44 |
| 6,252,576 B1 * | 6/2001 | Nottingham | ................ | 345/660 |
| 6,314,136 B1 * | 11/2001 | Kilgariff | ..................... | 375/240 |
| 6,421,094 B1 * | 7/2002 | Han | ............................. | 348/569 |
| 6,452,970 B1 * | 9/2002 | Kaup | ...................... | 375/240.1 |
| 6,504,533 B1 * | 1/2003 | Murayama et al. | ......... | 345/204 |
| 6,683,987 B1 * | 1/2004 | Sugahara | .................... | 382/235 |
| 2001/0008428 A1 * | 7/2001 | Oh | .............................. | 348/649 |
| 2001/0019079 A1 * | 9/2001 | Massieu et al. | ........... | 235/462.1 |
| 2001/0043163 A1 * | 11/2001 | Waldern et al. | ................. | 345/7 |
| 2002/0097921 A1 * | 7/2002 | Wakisawa et al. | .......... | 382/300 |
| 2002/0113898 A1 * | 8/2002 | Mitsuhashi | .................. | 348/578 |
| 2002/0118019 A1 * | 8/2002 | Nomura | ....................... | 324/509 |
| 2003/0021347 A1 * | 1/2003 | Lan et al. | .............. | 375/240.27 |
| 2003/0021486 A1 * | 1/2003 | Acharya | ..................... | 382/250 |
| 2003/0053702 A1 * | 3/2003 | Hu | .............................. | 382/238 |
| 2003/0112333 A1 * | 6/2003 | Chen et al. | .................. | 348/192 |
| 2003/0206582 A1 * | 11/2003 | Srinivasan et al. | ..... | 375/240.01 |

OTHER PUBLICATIONS

Cabeen et al., "Image Compression and the Discrete Cosine Transform", Fall 1998.*
Zwernemann, Brad. "An 8X8 DCT Implementation on the Motorola DSP56800E". Rev. 0, Aug. 2001.*
LF3320, by Logic Devices Incorporated (Copyright Aug 24, 1999 and Apr. 18, 2001).*

(Continued)

*Primary Examiner*—Kee M. Tung
*Assistant Examiner*—J. Amini

(57) ABSTRACT

A graphics processing device for converting coefficients in a video data stream from a first type, e.g., frequency-domain, to a second type, e.g., color-domain. The device includes an input for receiving the video data stream including a set of coefficients of the first type and a storage medium holding a data structure containing a first set of coefficients of the second type. The device further includes a processor communicating with the input and with the storage medium. The processor uses the data structure to convert the set of coefficients of the first type to a second set of coefficients of the second type. The device also includes an output in communication with said processor, for releasing an output video data stream including the second set of coefficients of the second type. The same data structure is used repeatedly for each incoming set of coefficients of the first type, thus allowing a transform, such as an IDCT, to be computed efficiently.

20 Claims, 8 Drawing Sheets

OTHER PUBLICATIONS

Neelamani et al. "Compression Color Space Estimation of JPEG Images Using Lattice Basis Reduction". May 3, 2001.*

Lee, Woobin. "DCT and IDCT" (1995).*

A Faster Discrete Fourier Transform, posted in Oct. 2001 by Ian Kaplan as part of A notebook Compiled While Reading Understanding Digital Signal Processing by Lyons, downloaded from http://www.bearcave.com/misl/misl-tech/signal/fasterdft on Jan. 17, 2002.

Fast DCT (Discrete Cosine Transform) algorithms, posted on unknown date, downloaded from http://www.faqs.org/faqs/compression-faq/part1/section-19.html on Jan. 17, 2002.

Video Demystified, by Keith Jack, Chapter 10: Video Compression / Decompression, pp. 374-385.

CL 480 MPEG System Decoder User's Manual, Chapter 2: MPEG Overview, pp. 9-20; C-Cube Microsystems 1995.

Information Technology—Generic Coding of Moving Pictures and Associated Audio Information: Video, ISO/IEC 13818-2: 2000(E), ITU-T Rec. H.262(2000E), pp. 1-120.

Information Technology—Generic Coding of Moving Pictures and Associated Audio Information: Video, ISO/IEC 13818-2, ITU-T Draft Rec. H.262, May 10, 1994, p. 131.

* cited by examiner

EFFICIENT VIDEO PROCESSING METHOD AND SYSTEM

FIELD OF THE INVENTION

The present invention relates generally to video decoding or encoding and, in particular, to the efficient transformation of image data between the frequency and color domains.

BACKGROUND OF THE INVENTION

It is desirable to compress image signals that are used with computer systems, since an image signal for a single uncompressed high-resolution digitized color image can easily consume several megabytes of memory. Because images tend to have low information content, very good compression rates are usually possible. This is especially true if, as is often the case for image signals used with computer systems, perfect reproduction is not required. In such instances, the low-frequency components of a frequency-domain image signal are perceptually more important in reproducing the image than the high-frequency components of the frequency-domain image signal. Thus, compression schemes that are applied to the frequency-domain version of an image signal do not waste bits in attempting to represent the relatively less significant high-frequency portions of the image signal.

Accordingly, it is desirable to transform an image signal from the spatial domain (also referred to as the "color domain") to the frequency domain prior to compressing the image signal. Naturally, an inverse operation is required to transform the image signal from the frequency domain back into the color domain prior to representation on a screen, such as a computer monitor. One type of mathematical transform that is suitable for transforming image signals in this manner is the discrete cosine transform (DCT). A DCT includes a pair of transforms, namely a forward DCT (FDCT), which maps a digitized (color-domain) signal to a frequency domain signal, and an inverse DCT (IDCT), which maps a frequency domain signal to a signal in the color domain. The DCT and IDCT are important steps in several international standards such as MPEG-2 (H.262), MPEG-1 (H.261) and MPEG-4 (H.263).

However, although the encoding of an image signal using the FDCT provides a definite advantage in terms of compression, there is an associated penalty in terms of the amount of processing required to decode the image signal when successive images are to be displayed. That is to say, a processing unit designed to decode image signals must be capable of performing the IDCT operation sufficiently quickly to allow full-frame video playback in real time.

By way of example, to perform decoding of a 1024-by-1024-pixel color image requires 49,152 IDCTs of size 8-by-8 (namely, $3\times(1024\times1024)/(8\times8)$). Furthermore, the calculation of a single 8-by-8 IDCT in a conventional manner requires more than 9,200 multiplications and more than 4,000 additions. Thus, if 30 images are to be displayed in each second, as is suggested to provide full-motion video, then the total number of multiplications per second rises to over 13 billion and the total number of additions per second reaches more than 5 billion. Such tremendous processing requirements heavily influence the design of the processing unit hardware and software.

With the aim of providing the requisite processing power, several approaches have been considered. One such approach consists of performing a set of single-dimensional IDCTs on the individual rows of each successive received matrix of frequency-domain values, followed by a series of single-dimensional IDCTs on the resultant columns. Such a technique can reduce the number of multiplications and additions required to perform a complete IDCT. It has also been known to perform fused multiply-add instructions to further reduce the number of computations involved in performing the IDCT. In both of these cases, however, the decoding speed of the algorithms is directly dependent on the degree to which the main processor of the host system is occupied with other tasks, such as input/output (I/O) handling.

Other prior approaches have consisted of using a relatively simple software algorithm in conjunction with dedicated hardware support in the form of a dedicated IDCT co-processor. The use of a dedicated IDCT co-processor in the GPU has the potential to offer a more scalable solution since the decoding speed of the IDCT is no longer tied to the speed or availability of the main processor of the host system. However, the addition of a dedicated IDCT co-processor increases the cost and complexity of the hardware employed to effect video decoding.

Yet another way of providing hardware support for IDCT execution has consisted of providing specialized logic gates in the GPU. This approach affords marginal reductions in cost and complexity relative to the IDCT co-processor approach, while continuing to provide a decoding speed that is independent of the processing speed or availability of the main processor. However, the sheer amount of semiconductor real estate occupied by specialized logic gates capable of implementing a standard IDCT algorithm leave little room for the implementation of other important functional blocks of the GPU.

Therefore, it would be advantageous to enable fast decoding of the IDCT in a GPU but without the need to provide additional hardware and without unduly monopolizing the resources of the main processor in the GPU.

SUMMARY OF THE INVENTION

The present invention provides a method and system that allow a transform to be computed efficiently using a graphics processing unit.

According to a first embodiment, the present invention provides a graphics processing device for converting coefficients in a video data stream from a first type, e.g., frequency-domain, to a second type, e.g., color-domain. The device includes an input for receiving the video data stream including a set of coefficients of the first type and a storage medium holding a data structure containing a first set of coefficients of the second type. The device further includes a processor communicating with the input and with the storage medium. The processor uses the data structure to convert the set of coefficients of the first type to a second set of coefficients of the second type. The device also includes an output in communication with the processor, for releasing an output video data stream including the second set of coefficients of the second type.

In a specific embodiment, the video data stream at the input is organized into plural sets of coefficients of the first type. The processor uses the data structure repeatedly to convert each such set of coefficients of the first type to a corresponding second set of coefficients of the second type. The processor may also perform a scaling operation on the set of coefficients of the first type prior to using the data structure to convert the set of coefficients of the first type to the second set of coefficients of the second type.

In using the data structure to convert the set of coefficients of the first type to the second set of coefficients of the second type, the processor may execute parallel multiply-accumulate instructions involving the set of coefficients of the first type and the first set of coefficients of the second type.

According to a second broad aspect, the present invention provides computer-readable media tangibly embodying a program of instructions executable by a computer to perform various methods of transforming an ordered set of N first coefficients representative of a signal in a first domain into an ordered set of M second coefficients representative of the signal in a second domain.

In one case, the method includes accessing an ordered set of N ordered sets of M pre-computed factors each, the $n^{th}$ ordered set of pre-computed factors, $1 \leq n \leq N$, being associated with the $n^{th}$ one of the first coefficients; and computing the second coefficients as a function of the first coefficients and the ordered sets of pre-computed factors.

In another case, the method includes receiving the video data stream including coefficients of the first type; performing a scaling operation on the coefficients of the first type; converting the scaled coefficients of the first type to coefficients of the second type; performing an inverse scaling operation on the coefficients of the second type; and releasing a video data stream including the inversely scaled coefficients of the second type.

In yet another case, the method includes receiving the video data stream including coefficients of the first type; grouping the coefficients of the first type into a plurality of distinct groups on a basis of a characteristic of each of the coefficients of the first type; converting the distinct groups of the coefficients of the first type to respective intermediate coefficient groups; combining the intermediate coefficient groups, thereby to generate the coefficients of the second type; and releasing an output video data stream including the coefficients of the second type.

In still another case, the method includes receiving the video data stream including coefficients of the first type; performing a scaling operation on each of a plurality of distinct groups of the coefficients of the first type; converting the distinct groups of the coefficients of the first type to respective intermediate coefficient groups; performing an inverse scaling operation on each of the intermediate coefficients groups; combining the inversely scaled intermediate coefficient groups, thereby to generate the coefficients of the second type; and releasing an output video data stream including the coefficients of the second type.

The present invention may also be summarized broadly as a graphics processing unit for converting a frequency-domain video data stream into a corresponding spatial-domain video data stream. The graphics processing unit includes an input for receiving the frequency-domain video data stream including a set of frequency-domain coefficients and a storage medium holding a data structure containing a plurality of color-domain basis sets, one for each of the coefficients in the set of frequency-domain coefficients. The graphics processing unit also includes a processor communicating with the input and with the storage medium. The processor uses the color-domain basis sets to convert the set of frequency-domain coefficients to a set of color-domain coefficients. The graphics processing unit further includes an output in communication with the processor, for releasing the spatial-domain video data stream including the set of color-domain coefficients.

In the following, the term "matrix" is not to be limited to a two-dimensional logical or physical arrangement of elements but is to be interpreted broadly as an ordered set of elements, which may occupy up to three physical dimensions when stored in a memory and any number of logical dimensions when referred to in software.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
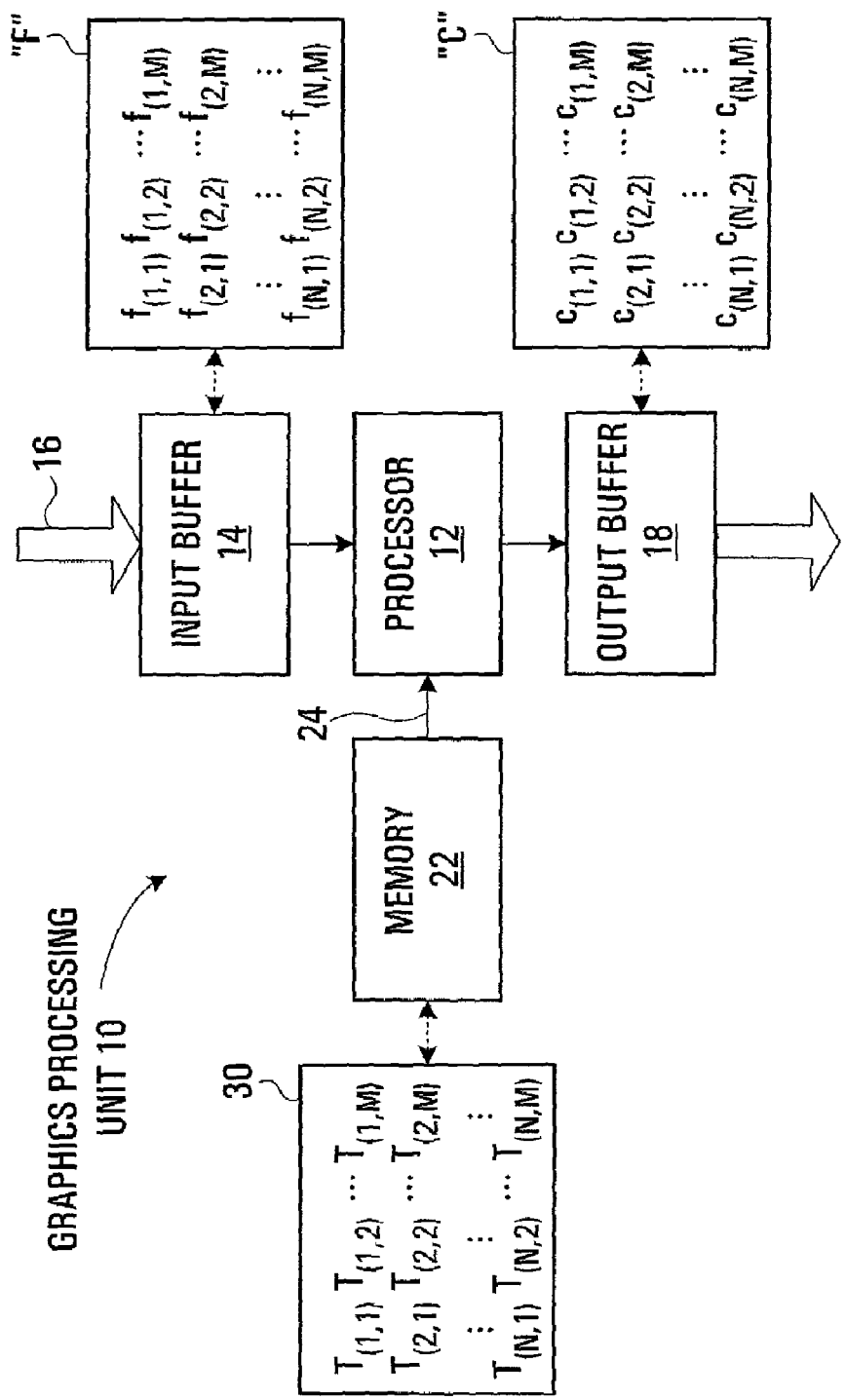
FIG. 1 is a logical block diagram of a graphics processing unit (GPU) in accordance with an embodiment of the present invention, including a processor and a memory.

With reference to FIG. 1, there is shown a graphics processing unit 10 in accordance with an embodiment of the present invention. The graphics processing unit 10 includes a processor 12 adapted to read an N-by-N matrix "F" of frequency-domain coefficients $f(x,y)$, $1 \leq x \leq N$, $1 \leq y \leq N$, from an input buffer 14. The input buffer 14 is connected via a communications link 16 to a source (not shown) of incoming frames of a moving image. Therefore, each N-by-N matrix "F" of input coefficients $f(x,y)$, $1 \leq x \leq N$, $1 \leq y \leq N$, holds the frequency-domain representation of an individual frame of the moving image.

The role of the processor 12 is to transform each successive N-by-N matrix "F" of frequency-domain coefficients $f(x,y)$, $1 \leq x \leq N$, $1 \leq y \leq N$, into a corresponding N-by-N matrix "C" of color-domain coefficients $c(x,y)$, $1 \leq x \leq N$, $1 \leq y \leq N$. To this end, the processor 12 is configured to have access to a memory medium 22 which stores an assortment of pre-computed factors, to be described in greater detail herein below. Once generated, the color-domain coefficients $c(x,y)$, $1 \leq x \leq N$, $1 \leq y \leq N$, are provided to an output buffer 18, from which individual color-domain coefficients are passed to other subsequent processing stages.

Desirably, the transformation effected by the processor 12 is achieved using IDCT techniques, the details of which are described herein below. However, other transform techniques are possible, which may allow the number of rows in either of the two matrices "C" and "F" to be different from the number of columns and which may also lead to the matrix "C" having different dimensions than the matrix "F". In the following, it will be assumed, although without requiring this to be the case in all embodiments, that the matrices in both domains are square and have the same dimensions.

It should be mentioned that the term "matrix" has been used because it is easy for one to visualize the pixels of a two-dimensional image being represented as a matrix. However, in its broadest sense, the term "matrix" is not intended to connote a limitation on the manner in which data is stored or on the dimensionality of an array used in software to represent the data. Rather, the term "matrix" is to be interpreted broadly as an ordered set of elements, which may occupy up to three physical dimensions when stored in a memory and any number of logical dimensions when referred to in software.

In one embodiment, each frequency-domain coefficient $f(x,y)$, $1 \leq x \leq N$, $1 \leq y \leq N$ may be represented using 12 bits and each color-domain coefficient $c(x,y)$, $1 \leq x \leq N$, $1 \leq y \leq N$ may be represented using 9 bits. The available dynamic ranges for the frequency-domain and color-domain coefficients has been selected in this case to provide compatibility with certain international standards such as IEEE Standard 1180:1990, dated Dec. 6, 1990, entitled "*Standard Specifications for the Implementations of* 8 *by* 8 *Inverse Discrete Cosine Transform*" and incorporated by reference herein. However, it should be understood that the techniques described herein are not limited to any particular number of bits for the frequency-domain or color-domain coefficients.

In a real-time environment, frames are read from the output buffer 18 at substantially the same rate as frames arrive at the input buffer 14 (e.g., at a rate of 30 frames per second or more in order to give a scene the appearance of smooth motion). Therefore, in order to provide full-motion video with a limited frame latency between input and output, an IDCT-based video decoding operation needs to be performed on each matrix "F" within the amount of time allotted to a frame (on the order of 33 milliseconds or less).

Mathematically, the IDCT relates the color-domain coefficients $c(x,y)$, $1 \leq x \leq N$, $1 \leq y \leq N$ to the frequency-domain coefficients $f(x,y)$, $1 \leq x \leq N$, $1 \leq y \leq N$ in the following manner:

$$c(x, y) = \frac{2}{N} \sum_{u=1}^{N} \sum_{v=1}^{N} \alpha(u)\alpha(v) f(u, v) \cos\left(\left(\frac{2(x-1)+1}{2N}\right)(u-1)\pi\right)$$
$$\cos\left(\left(\frac{2(y-1)+1}{2N}\right)(v-1)\pi\right)$$
$$= \sum_{u=1}^{N} \sum_{v=1}^{N} f(u, v) t_{u,v}(x, y),$$

where
$1 \leq x \leq N$, $1 \leq y \leq N$;
$t_{u,v}(x,y) = 2/N \alpha(u) \alpha(v) \cos ((2(x-1)+1)(u-1)\pi)/2N) \cos ((2(y-1)+1)(v-1)\pi)/2N)$;
$\alpha(n) = 1/\sqrt{2}$, for $n=1$; and
$\alpha(n) = 1$, for $n \neq 1$.

From the above equation for $c(x,y)$, it can be seen that the term $f(u,v)$ is the only term that varies, as it corresponds to the frequency-domain coefficient in row u, column v of the matrix "F". The other terms in the equation are all constant and therefore can be pre-computed and stored as constant factors.

In particular, it is noted that each element $c(x,y)$ of the matrix "C" is the linear combination, over all u and v, of the elements $f(u,v)$ of the matrix "F" and the pre-computed factors $t_{u,v}(x,y)$. Thus, the matrix "C" is the linear combination, over all u and v, of each element $f(u,v)$ of the matrix "F" with a corresponding pre-computed matrix $T_{u,v}$, where the pre-computed matrix $T_{u,v}$ is defined as the IDCT of a sparse matrix $\beta_{u,v}$ with all zeros except for a "one" in row u and column v. It should therefore be apparent that the pre-computed matrices $T_{u,v}$ represent color-domain basis sets for the computation of the complete IDCT. Pre-computation of the individual basis sets, i.e., matrices $T_{u,v}$, may be achieved off-line by performing arithmetic operations or through the use of look-up tables.

Figure 2:
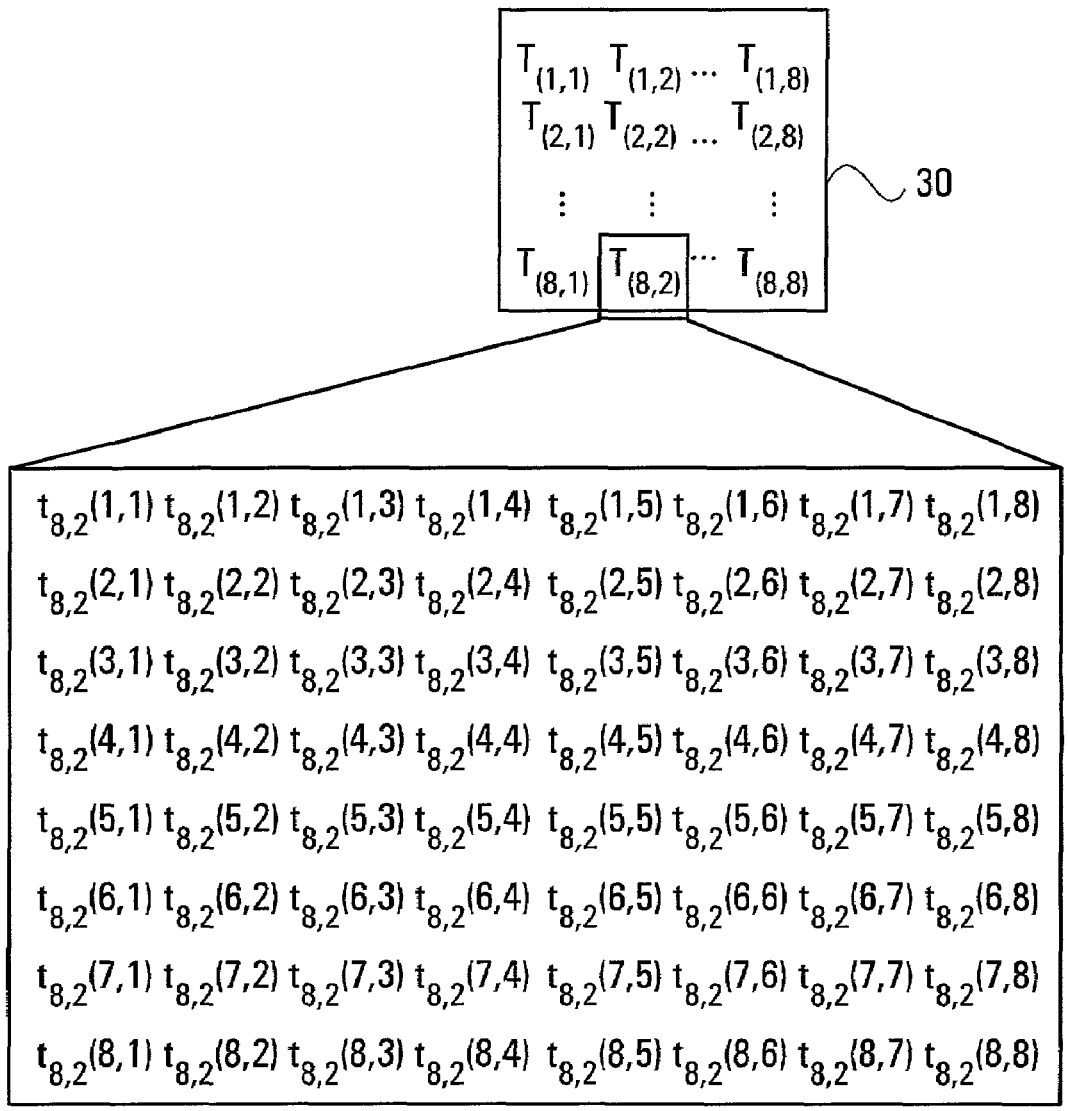
FIG. 2 depicts one possible layout for a pre-computed matrix stored in the memory unit and used by the GPU of FIG. 1.

As shown in FIG. 2, for convenience of representation, the pre-computed matrices $T_{u,v}$ may be grouped into a larger array 30. In this example embodiment, N=8 and thus each pre-computed matrix $T_{u,v}$, $1 \leq u \leq 8$, $1 \leq v \leq 8$, is an 8-by-8 matrix of pre-computed factors with the element in row x, column y of matrix $T_{u,v}$ being the pre-computed factor $t_{u,v}(x,y)$. It follows that the evaluation of color-domain coefficient $c(x,y)$ (for any value of x between 1 and 8 and any value of y between 1 and 8) is the cumulative sum (over all values of u and v between 1 and 8) of the individual products formed by multiplying element $f(u,v)$ of the matrix "F" with the element in row x, column y of pre-computed matrix $T_{u,v}$.

The above technique allows the GPU 10 to perform IDCT computations more efficiently that in prior approaches. In some embodiments of the invention, the efficiency of the IDCT computation can be further increased by virtue of the properties of the instruction set of the processor 12 in the GPU 10.

Specifically, the processor 12 may be equipped with the ability to perform, in a single clock cycle, a multiply-accumulate instruction involving a pair of multi-element vectors. For example, pixel shaders commonly written for the rendering of three-dimensional objects provide such multiply-accumulate capability in their instruction set. Moreover, pixel shaders also often allow independent multiply-accumulate operations to be performed, in parallel, on multiple pairs (e.g., up to 64) of multi-element vectors.

Hence, a multiply-accumulate instruction capable of performing independent multiply-accumulates on 64 pairs of 8-vectors can be viewed as forming a single 8-by-8 matrix that is the element-by-element sum of 8 original matrices, each having been multiplied by a respective one of 8 scalars. This concept can be applied to advantage in the execution of the IDCT in the following way.

Figure 3A:
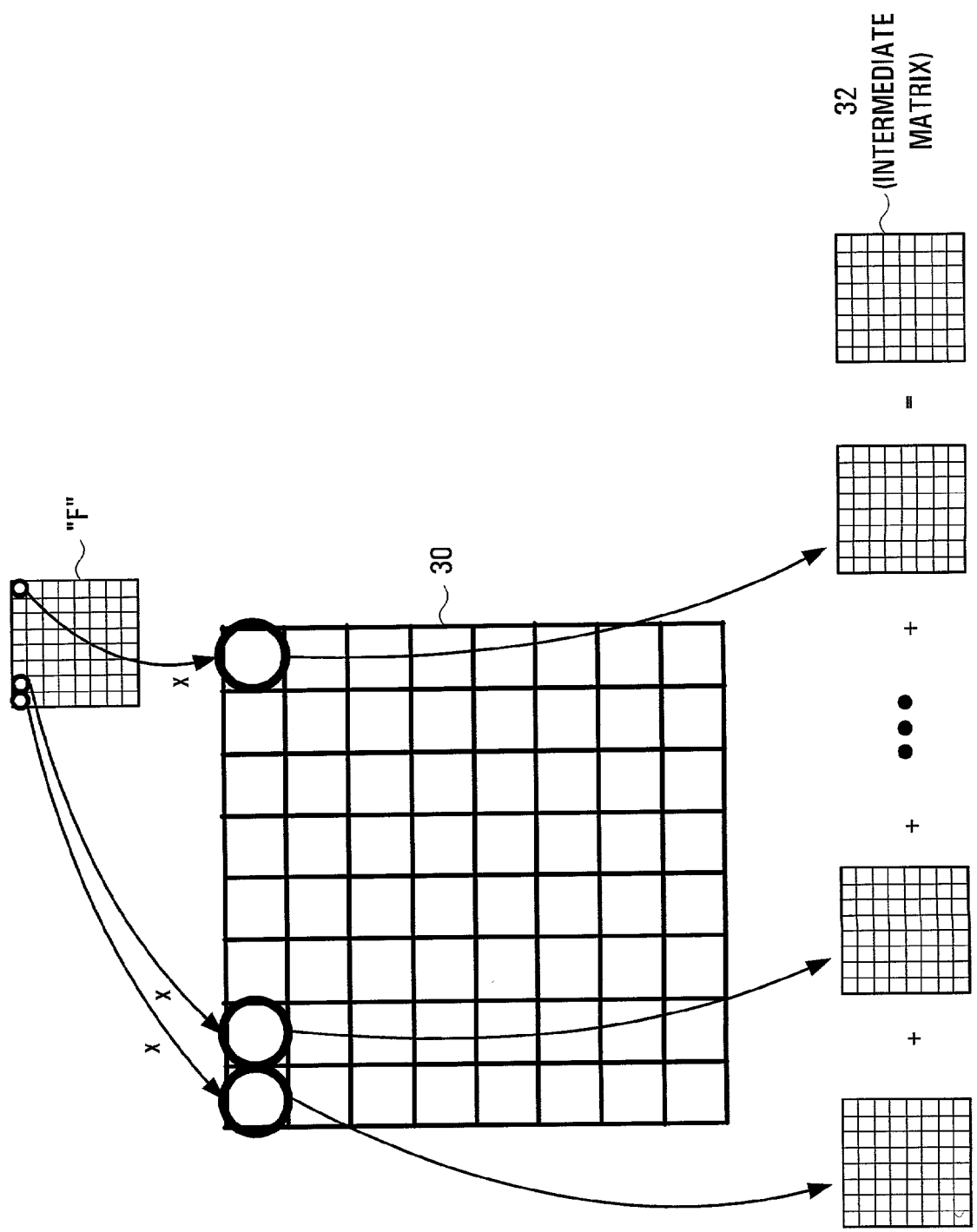
FIGS. 3A and 3B show, conceptually, the steps involved in computation of intermediate matrices by the GPU, using the matrices of FIG. 2.
Figure 3B:
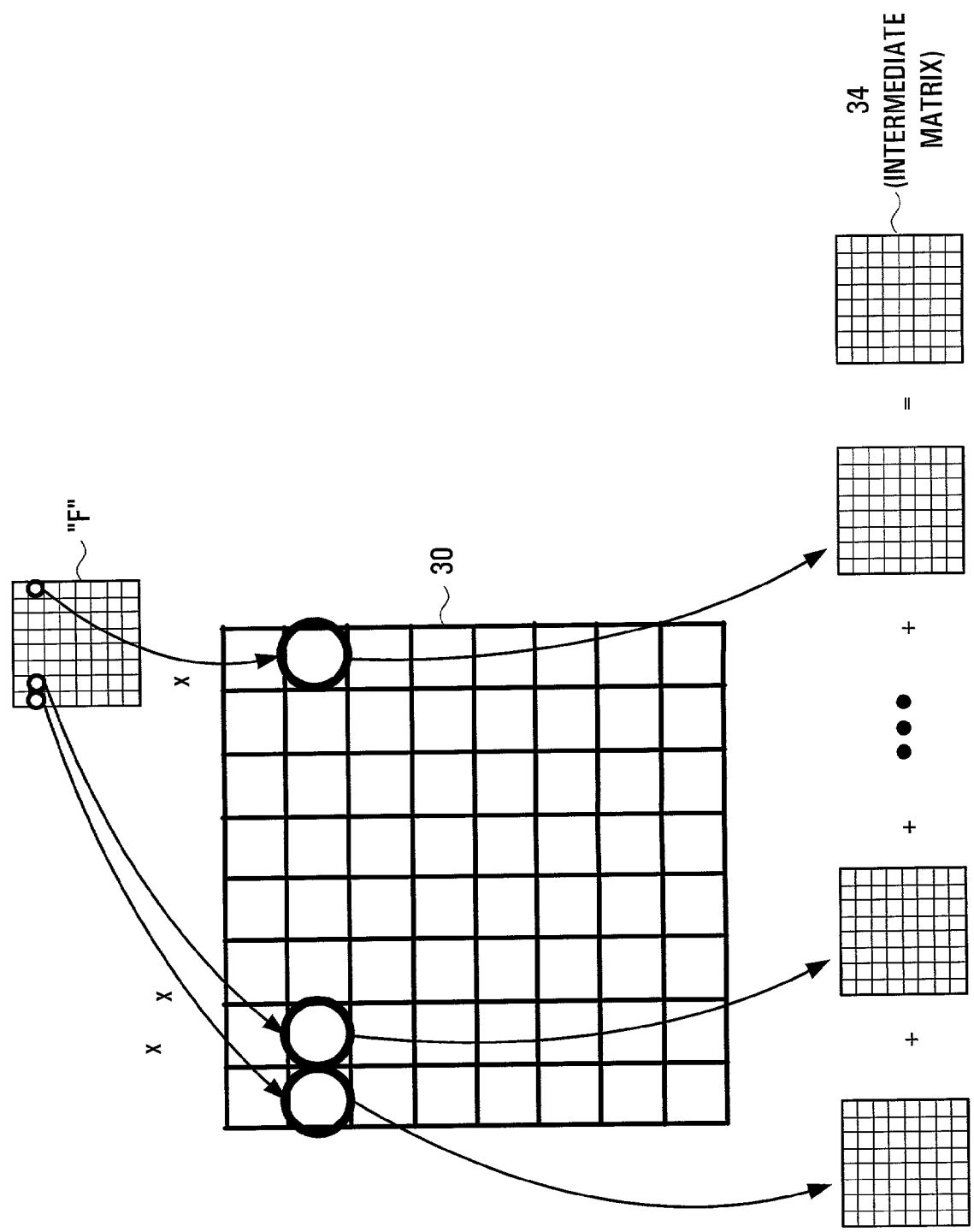

As illustrated in FIG. 3A, a first parallel multiply-accumulate instruction could be used to obtain the sum of:

$(T_{1,1} \times f(1,1)) + (T_{1,2} \times f(1,2)) + \ldots + T_{1,8} \times f(1,8))$, resulting in a first intermediate 8-by-8 matrix, denoted 32. Next, as illustrated in FIG. 3B, a second parallel multiply-accumulate instruction could be used to obtain the sum of:

$(T_{2,1} \times f(2,1)) + (T_{2,2} \times f(2,2)) + \ldots + T_{8,8} \times f(8,8))$, resulting in a second intermediate 8-by-8 matrix, denoted 34. This process is repeated six more times, resulting in the generation of additional intermediate matrices. It is therefore apparent that eight instantiations of the 8-way parallel multiply-accumulate instruction would be required to execute all of the scalar multiplications required of the IDCT computation.

A final stage is then needed to add the eight intermediate matrices in order to produce the matrix "C", and this can be achieved via one final instantiation of the parallel multiply-add instruction (with the vector of scalars set to [1 1 1 1 1 1 1 1], since no multiplication is required at this final stage).

Thus, it is noted that a mere 9 instantiations of the above-described parallel multiply-add instruction are sufficient for computation of a complete 8-by-8 IDCT. More generally, an N-by-N IDCT can be computed using parallel multiply-add instructions capable of multiplying and accumulating the product of W matrices of size N×N with a vector of W scalars in as few as $N^2/W + N^2/W^2 + \ldots + 1$ operations. This is noteworthy not only because of the savings in terms of computation time with respect to conventional computation of the IDCT, but also because savings are achieved through the exploitation of hardware already extant within the GPU 10. Of course, it should be understood that W need not be equal to a root of $N^2$. If it is indeed the case that W is not a root of $N^2$, then up to $\log_W N_2$ additional operations may need to be performed.

Notwithstanding the remarkable efficiency of the above-described IDCT computation technique, there are embodiments of the invention for which even more efficient performance can be achieved. This is based on the observation that an image will tend to have a predominance of lower-frequency components. Thus, it is often the case that one or more higher-frequency components, i.e., frequency-domain coefficients $f(x,y)$, $1 \leq x \leq N$, $1 \leq y \leq N$, occupying positions in the matrix "F" for which the values of x and y are larger rather than smaller, will be zero upon either generation or compression of the matrix "F". Consequently, any product involving any of these null coefficients will be zero.

Clearly, therefore, performing scalar multiplication and addition involving a null coefficient wastes computing and input/output (I/O) resources and thus it would be advantageous to avoid performing these unnecessary operations by first examining the elements of the matrix "F" prior to computation of the IDCT.

Stated differently, it is not necessary to fixedly assign the range of elements of the matrix "F" to which each parallel multiply-accumulate instruction will be applied. Rather, it is possible to select, for each new N×N matrix "F", the particular range of elements that will be used to generate the intermediate matrices 32, 34, etc. Hence, for a matrix "F" having Z non-zero elements, a complete IDCT computation could be performed using $Z/W^\rfloor + Z/W^{2\rfloor} + \ldots + 1$ parallel multiply-accumulate instructions, where ⌋ denotes the rounding up of a fraction to its next highest integer. In the limit, for a highly sparse matrix "F" with W (or fewer) non-zero frequency-domain coefficients, a single parallel multiply-accumulate instruction would suffice to perform the entire IDCT.

Those skilled in the art will appreciate that arithmetic operations involving numerous multiplications and additions are subject to the possibility of overflow and/or loss of precision. By "overflow" is meant the situation in which even though a final result of an arithmetic manipulation may lie in range that is representable by a given number of bits, the intermediate results that lead to the final result are too large to be represented by the given number of bits. This leads to a distorted value for the final result of the operation. On the other hand, by "loss of precision" (sometimes termed "underflow") is meant the situation in which very small values are truncated or rounded at intermediate stages, causing the individual errors generated by numerous roundings or truncations to accumulate and bias the final result of the operation.

The problems of overflow and loss of precision are more prevalent with fixed-point arithmetic than they are with floating-point arithmetic, since the dynamic range of a fixed-arithmetic representation is much narrower than the dynamic range of a floating-point representation. However, although the use of floating-point arithmetic leads to fewer overflow/underflow issues, its use is not always recommended for high-speed real-time processing applications. Therefore, it is expected that overflow and loss of precision problems will need to be overcome in a graphics processing unit 10 employing a fixed-point processor 12.

One possible solution to the overflow problem is to apply a preventative measure (a "reduction factor") prior to the execution of any arithmetic operations. In addition, an opposite, compensatory measure is applied to the result obtained after the last arithmetic operation has been executed. The preventative measure, which may be achieved by bit shifting, for example, effectively moves the dynamic range of representable numbers to the subset of rational numbers where it is needed most.

Therefore, rather than limit the absolute smallest and absolute largest values that may be assigned a base-two representation, the preventative measure adjusts the absolute largest value as appropriate, and the granularity associated with the representation of smaller values depends on the number of available bits. Of course, since a result represented in this "shifted" domain is necessarily biased, the compensatory measure, which follows execution of the arithmetic operations, introduces an equal and opposite bias, so that the base-two number accurately represents the result of the entire operation.

By way of example, the overflow problem can be addressed by determining the hypothetical worst-case maximum value of the final result and consequently reducing the value of each of the frequency-domain coefficients as a function of this hypothetical worst-case maximum value. The worst-case overflow arises when all of the frequency-domain coefficients are of the same sign and multiply the greatest amongst all pre-computed factors in the matrix 30.

Figure 4:
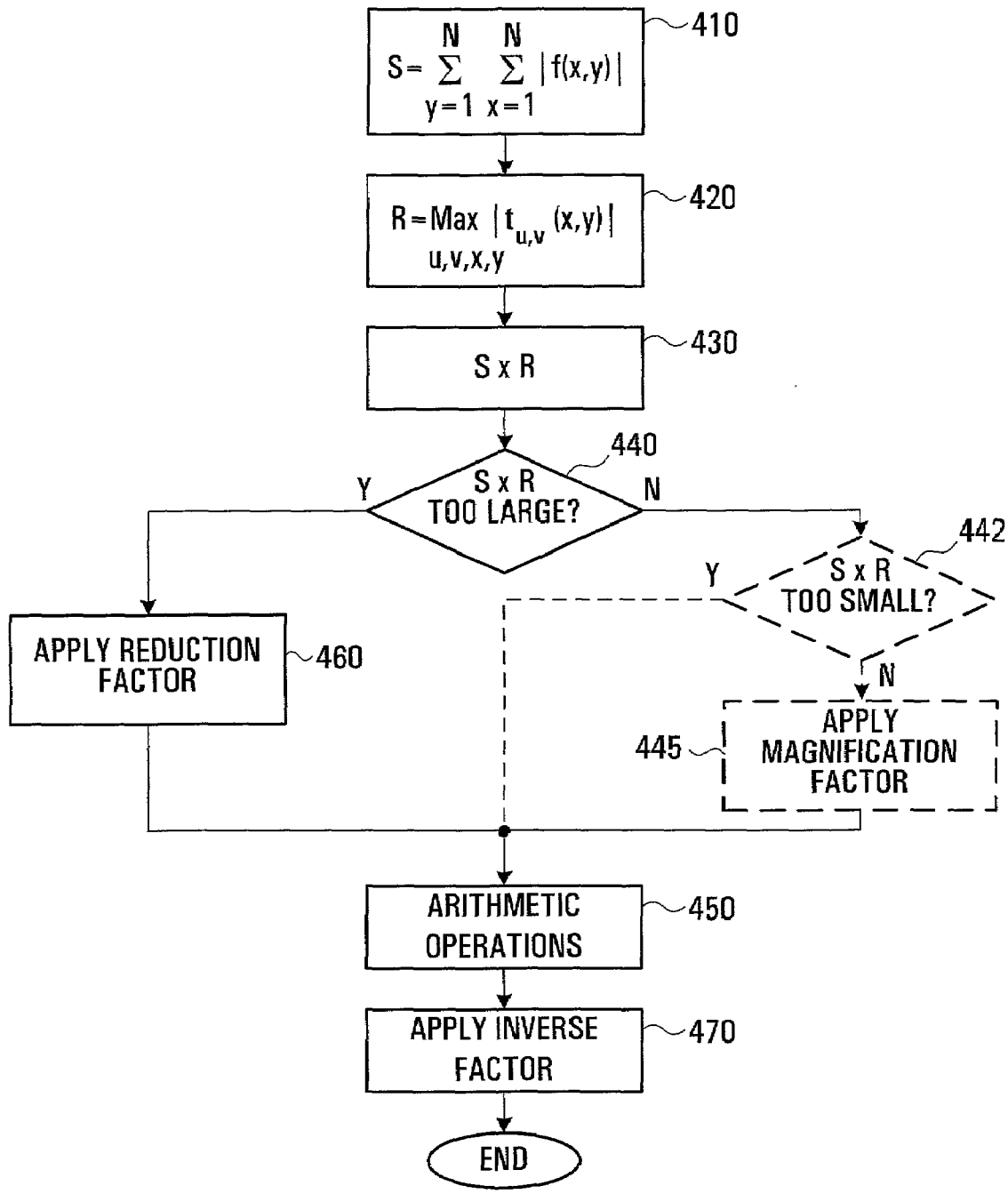
FIG. 4 shows steps in an example process that can be used to prevent overflow during operation of the GPU.
Figure 5:
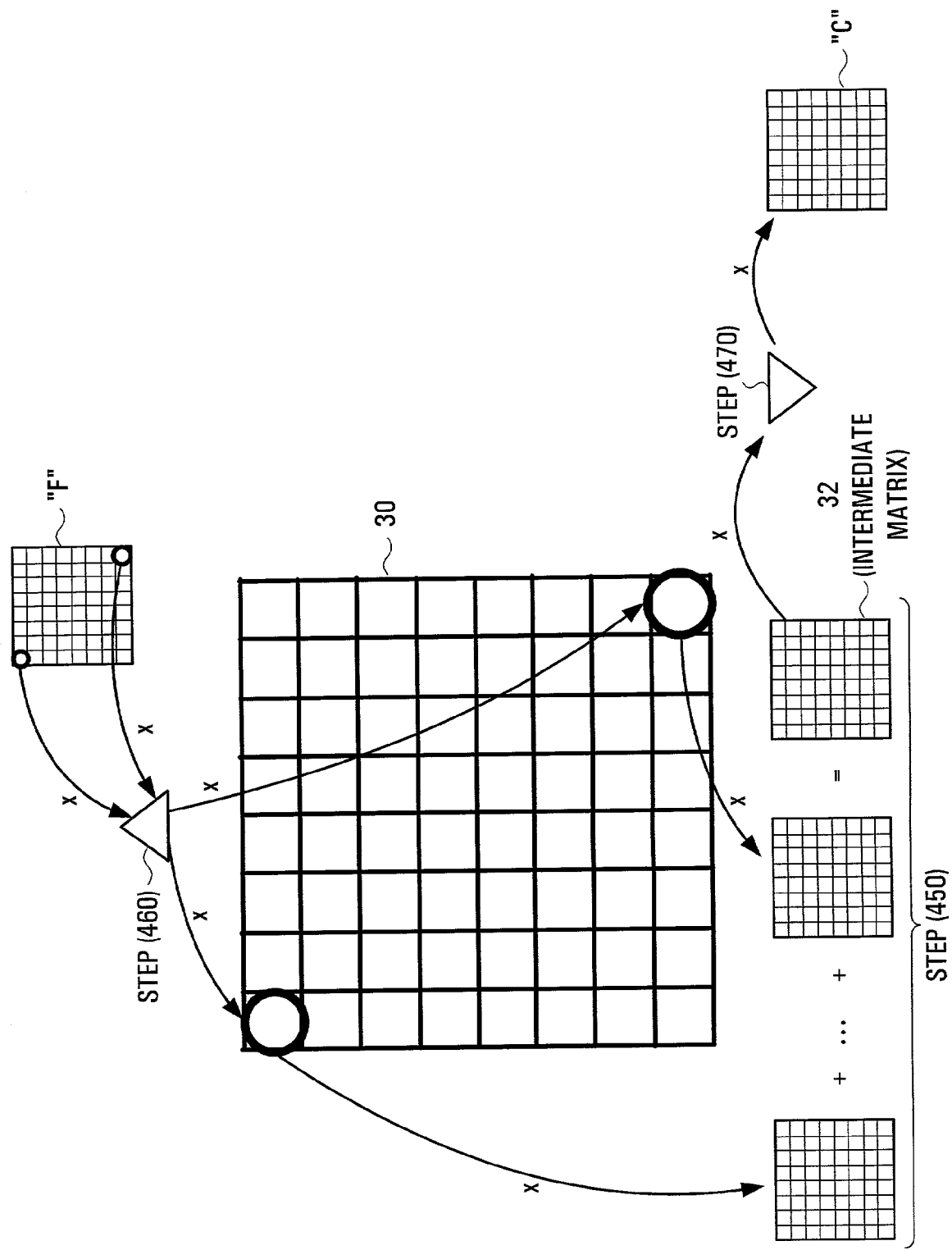
FIG. 5 shows, conceptually, a series of steps in the process of FIG. 4 in a specific embodiment of the present invention.

To prevent overflow, therefore, the IDCT operation performed by the processor 12 may include the steps shown in FIG. 4 and now described in greater detail. The understanding of various steps in the flowchart of FIG. 4 may be better appreciated by referring to the accompanying diagram of FIG. 5, which is specific to the case where N=8.

Specifically, at step 410, the processor 12 performs a summation (denoted "S") of the absolute value of all of the frequency-domain coefficients in the matrix "F". At step 420, the processor 12 determines the largest magnitude (denoted "R") amongst all of the pre-computed factors (i.e., the largest absolute value of any of the elements of any of the matrices $T_{u,v}$, $1 \leq u \leq N$, $1 \leq v \leq N$). At step 430, the processor 12 determines the product of the values found in steps 410 and 420, resulting in the worst-case maximum value for a color-domain coefficient. At step 440, the product found at step 430 is compared against the maximum value that can be represented by the number of bits available to a color-domain coefficient.

If the number of bits is adequate to represent the worst-case maximum value for a color-domain coefficient, then no reduction in coefficient value is required, and the processor 12 proceeds to step 450, consisting of performing the arithmetic operations as described earlier in this specification. If, however, the worst-case maximum color-domain coefficient is greater than the maximum value that can be represented using the available number of bits, then the processor 12 proceeds to step 460, where a sufficiently high "reduction factor" is applied in order to guarantee that the product formed at step 430, scaled by the reduction factor, will be amenable to representation by the available number of bits. The processor 12 then proceeds to step 450, described above.

Upon execution of the arithmetic operations at step 450, the processor 12 proceeds to step 470, where a compensatory measure, i.e., the inverse of the reduction factor used at step 460, is applied to each color-domain coefficient. Of course, if step 460 was never executed, then no inverse reduction factor needs to be applied. This is the end of the computation of the IDCT for the current input frame. It should be noted that the above-described technique is particularly advantageous in those instances where the final color-domain coefficients (obtained upon completion of step 470) "fit" within the given number of bits, even though certain intermediate results would otherwise have exceeded the maximum value for a color-domain coefficient.

For its part, the loss of precision (underflow) problem can be addressed by providing a magnification factor rather than a reduction factor. Thus, upon execution of step 440 in FIG. 4, if the number of bits is found to be adequate to represent the worst-case maximum value for a color-domain coefficient, then step 442 is executed, whereby it is verified whether the color-domain coefficients have the opposite tendency of being relatively small and prone to underflow problems.

If step 442 reveals that the color-domain coefficients are as large as possible, then it is not necessary to provide protection for underflow and the processor 12 proceeds to step 450, described above. However, if the color-domain coefficients are small enough to be magnified, then a suitable magnification factor is applied at step 445. The object of applying a magnification factor is to cause the product formed at step 430, when scaled by the magnification factor, to require the maximum number of available bits for its representation.

Following step 445, the processor 12 then executes steps 450 and 470, described above. It will be appreciated that the compensatory measure applied at step 470 should now take into account whether a reduction factor was applied at step 460 or whether a magnification factor was applied at step 445. Naturally, it is within the realm of possibility that no preventative measure, i.e., neither a reduction factor nor a magnification factor, will have been applied, in which case no compensatory measure needs to be applied at step 470.

It will also be appreciated that the above-described technique for underflow prevention is particularly advantageous in those instances where the final color-domain coefficients (obtained upon execution of step 470) are large enough to require one or more bits of representation, even though the values used in the arithmetic operations corresponding to the IDCT computation (step 450) are, in the absence of magnification, inferior to the smallest number to which a base-two representation can be assigned.

Of further note is the fact that when the IDCT computation involves the creation of intermediate results, such intermediate results may be subject to different conditions, i.e., some may be subject to overflow and others to loss of precision. To this end, it may be advantageous to combine the above-described overflow and underflow prevention techniques and to apply them to intermediate results obtained in the course of executing the IDCT in a stage-wise fashion.

Figure 6:
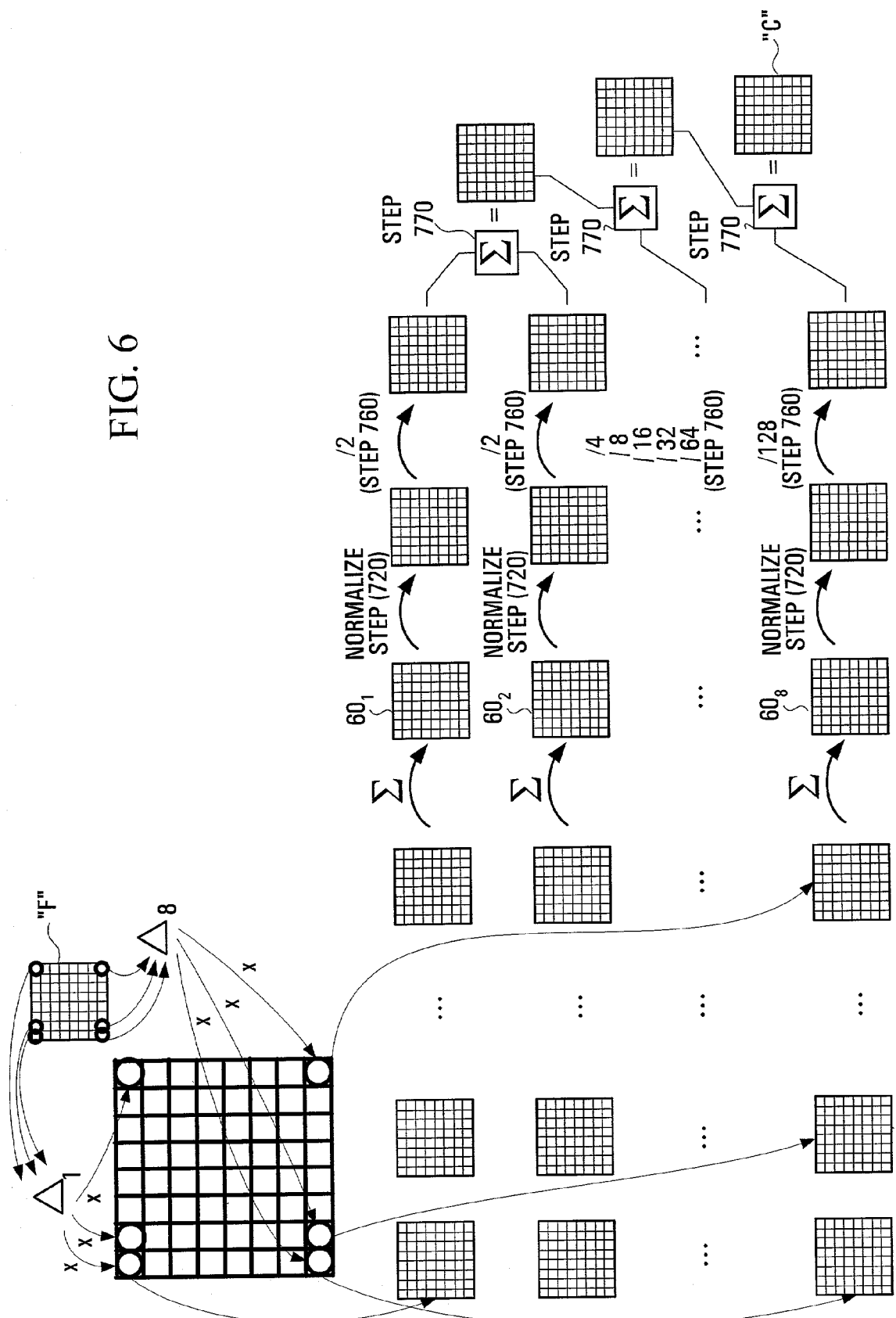
FIG. 6 shows, conceptually, a series of steps in an example process for preventing overflow and underflow during operation of the GPU.

Accordingly, as exemplified in FIG. 6, a "scaling factor" $\Delta_x$ can be applied to the frequency-domain coefficients $f(x,y)$, $1 \leq y \leq N$ (in this case, N=8) for a particular value of x, i.e., for a particular row of the matrix "F". Thus, scaling factor $\Delta_1$ applies to the frequency-domain coefficients in row 1, scaling factor $\Delta_2$ applies to the frequency-domain coefficients in row 2, etc. It should be apparent that the term "scaling factor" encompasses either a reduction factor (<1, to prevent overflow) or a magnification factor (>1, to prevent underflow). Selection of the appropriate scaling factor for a given row of the matrix "F" can be achieved using the approach described herein above with reference to FIG. 4, but considering the sum of only the elements in the appropriate row, rather than the sum of all of the elements of the matrix "F".

It is noted that eight intermediate matrices $60_v$, $1 \leq v \leq 8$, are in this case obtained, each such intermediate matrix containing eight rows of eight elements per row, the element in row x, column y of intermediate matrix $60_A$ being the dot product of the scaled eight-vector of elements in row A of the matrix "F" and the eight-vector of elements occupying position (x,y) in each of the eight matrices in row A of the matrix 30. Since each element of intermediate matrix $60_A$ is scaled by the scaling factor $\Delta_A$, and since the scaling factors for different intermediate matrices are independently selected, it is apparent that in order to add corresponding elements of the eight intermediate matrices $60_1, \ldots, 60_8$, an inverse scaling factor first needs to be applied to each intermediate matrix.

However, simply applying the inverse scaling factor prior to addition of corresponding elements of the intermediate matrices $60_1, \ldots, 60_N$ may result in underflow, which would defeat the purpose of having applied the scaling factors $\Delta_x$, $1 \leq x \leq N$, in the first place. Therefore, it is advantageous to split the inverse scaling process into two parts, one performed prior to addition of the corresponding elements of the intermediate matrices and another part performed after this element-by-element summation.

A suitable technique for applying inverse scaling to the intermediate matrices in this manner is now described with reference to the flowchart of FIG. 7, and with continued reference to FIG. 6 where N=8. At step 710, the smallest value amongst the $\Delta_x$, $1 \leq x \leq N$, is determined. This may be referred to as a "residual scaling factor" and is denoted $\Delta_{res}$.

At step 720, an inverse scaling factor is applied to each intermediate matrix, if applicable, in order to normalize the scaling factors applied to the intermediate matrices (i.e., in order to render the net scaling for all normalized intermediate matrices equal to the residual scaling factor $\Delta_{res}$). Upon such normalization, the matrices could conceivably be directly added together, followed by application of a de-normalizing factor.

However, there is a risk of overflow and this is averted in the following manner. Specifically, at step 730, a "base scaling factor" is set to 2. At step 740, a first intermediate matrix is selected and denoted "P". For each of the N−1 remaining intermediate matrices, the following steps are performed. Specifically, at step 750, a new intermediate matrix is selected and denoted "Q". At step 760, the elements of "P" are divided by 2 and the elements of "Q" are divided by the base scaling factor. Addition of the corresponding elements of "P" and "Q" is performed at step 770, resulting in a "temporary sum matrix".

Now, at step 780, the existence of other intermediate matrices that have not yet been added is determined. If such intermediate matrices exist, then the base scaling factor is doubled (at step 790), matrix "P" is set to equal the temporary sum matrix (at step 792) and the process returns to step 750. However, if all intermediate matrices have been added, then the temporary sum matrix is converted to the final matrix "C" of color-domain coefficients at step 794. Specifically, the matrix "C' is formed by a de-normalization process, namely, each element of the temporary sum matrix, multiplied by the most recent value of the base scaling factor (i.e., $2^{N-1}$), is divided by the residual scaling factor $\Delta_{res}$.

The above process allows overflow and underflow to be addressed on the basis of subsets of the elements of the matrix of frequency-domain coefficients "F", while continuing to reap the benefits arising from pre-computation of the matrices $T_{u,v}$ and continuing to afford the advantages of using parallel multiply-accumulate instructions.

Figure 7:
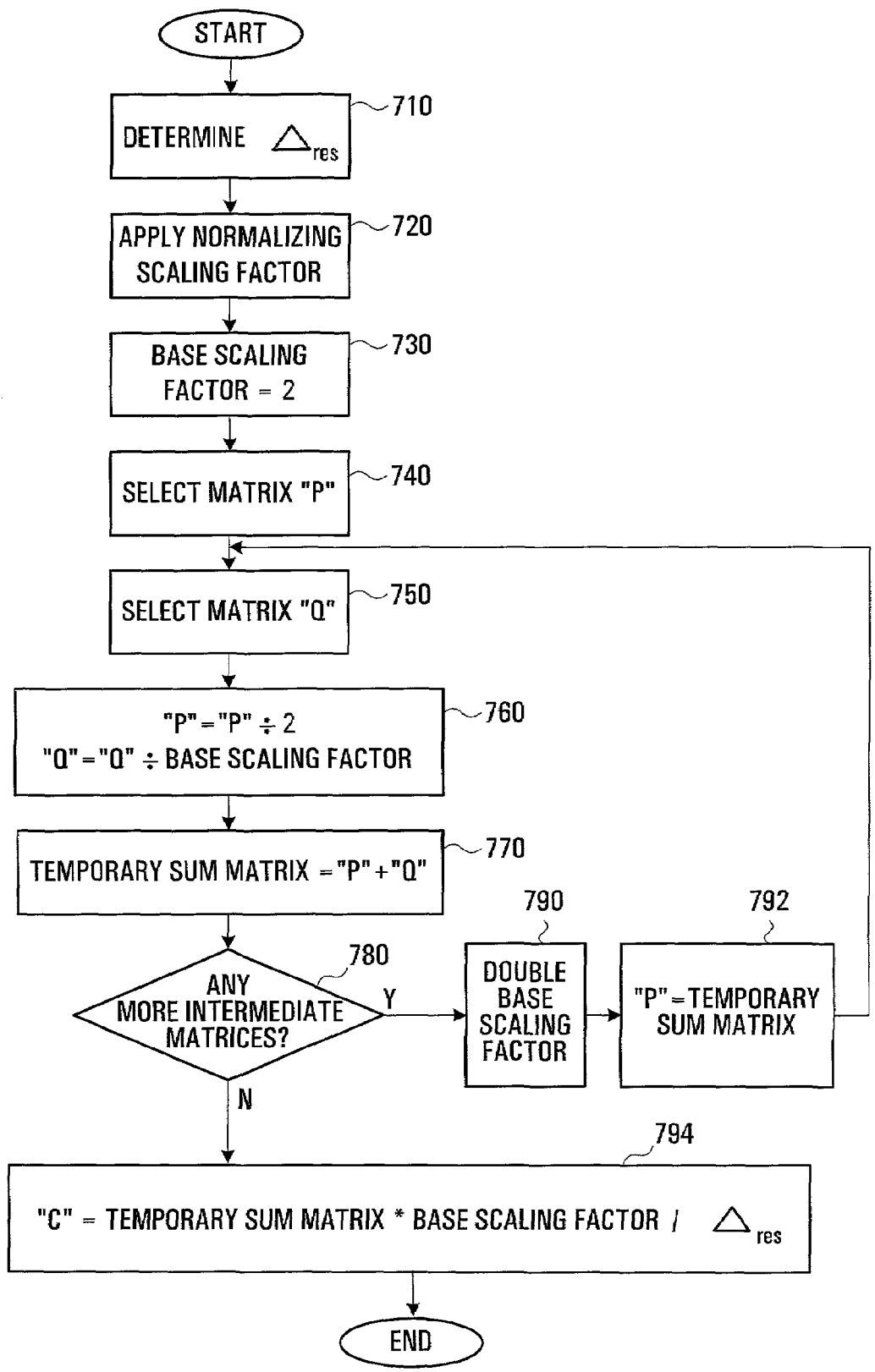
FIG. 7 shows steps in an algorithm that corrects for variations in scaling factors applied during the process of FIG. 6.

As a further extension of the technique of FIGS. 6 and 7, it is noted that each "scaling factor" $\Delta_x$ is computed on the basis of the frequency-domain coefficients $f(x,y)$, $1 \leq y \leq N$ for a particular value of x (i.e., for a particular row of the matrix "F"). Nonetheless, it is within the scope of the present invention to dynamically create different cluster of elements of "F", each of which is associated with its own scaling factor. Such dynamic clustering need not be performed on a per-row basis, especially in instances where the matrix "F" is not a two-dimensional array.

In fact, the dynamic clustering can be based on the absolute value of the frequency-domain coefficients, such that scaling factors will be associated to different groups of elements of "F" having absolute values in approximately the same range. This can further help minimize the risk of underflow and overflow. It is noted that the clusters of elements associated with a common scaling factor may change from one block of frequency-domain coefficients to the next.

It is also within the scope of the invention to further reduce the risk of underflow by ensuring that the order in which the temporary sum matrix is built up at step 770 begins with the addition of intermediate matrices with small-absolute-valued coefficients and continues with the addition of intermediate matrices having elements of progressively greater absolute value. To this end, it may be advantageous to select, as the initial matrix "P", the intermediate matrix associated with the frequency-domain coefficients of smallest absolute value, and to select, as successive matrices "Q", those intermediate matrices associated with the frequency-domain coefficients of increasing absolute value. This allows the color-domain coefficients to be accurately represented in a fixed-point notation, even when there is a wide disparity amongst the non-zero values of the frequency-domain coefficients.

Persons skilled in the art should of course appreciate that the present invention may be advantageously applied to transforms other than the inverse discrete cosine transform. For instance, the present invention could just as easily be applied to the forward discrete cosine transform, the forward and inverse discrete sine transforms, the discrete Fourier, Walsh-Hadamard, Hartley and various wavelet transforms, etc. Also, applicability of the present invention extends beyond the realm of image processing to such fields of endeavour as speech processing, audio processing and spread spectrum code-division multiple-access (CDMA), where one- or two-dimensional arrays are subject to transformation.

Those skilled in the art will also appreciate that the processor 12 may be implemented as an arithmetic and logic unit (ALU) having access to a code memory (not shown) which stores program instructions for the operation of the ALU. The program instructions could be stored on a medium which is fixed, tangible and readable directly by the processor, (e.g., removable diskette, CD-ROM, ROM, or fixed disk), or the program instructions could be stored remotely but transmittable to the processor 12 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions stored in the code memory can be compiled from a high level program written in a number of programming languages for use with many computer architectures or operating systems. For example, the high level program may be written in assembly language such as that suitable for use with a pixel shader, while other versions may be written in a procedural programming language (e.g., "C") or an object oriented programming language (e.g., "C++" or "JAVA").

Those skilled in the art will also appreciate that in some embodiments of the invention, the functionality of the processor 12 may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

We claim:

1. Computer-readable media tangibly embodying a program of instructions executable by a computer to perform a method of transforming an ordered set of N first coefficients representative of a signal in a first domain into an ordered set of M second coefficients representative of the signal in a second domain, the method comprising:

accessing an ordered set of N ordered sets of M pre-computed factors each, the $n^{th}$ ordered set of pre-computed factors, $1 \leq n \leq N$, being associated with the $n^{th}$ one of the first coefficients; and selecting one of a magnification factor and a reduction factor for applying to the ordered set of N first coefficients in order to avoid one of overflow and underflow during the transforming of the set of N first coefficients to the M second coefficients, said one of a magnification factor and a reduction factor being selected by:

a) determining a sum of absolute values of the first coefficients;

b) determining a maximum absolute value amongst the pre-computed factors;

c) computing a product of the sum of absolute values obtained in (a) and the maximum absolute value obtained in (b):

d) comparing the product obtained in (c) to a maximum value to which a machine-readable representation can be assigned;

e) if said product exceeds said maximum value to which a machine-readable representation can be assigned, selecting one of the magnification factor and the reduction factor to a value such that a product of the selected one of the magnification factor and the reduction factor with the product obtained in (c) does not exceed said maximum value to which a machine-readable representation can be assigned; otherwise, selecting a factor of unity;

applying the selected one of the magnification factor and the reduction factor to each of the N first coefficients, thereby to obtain an ordered set of N scaled first coefficients;

computing a set of N ordered sets of M intermediate values each, the $j^{th}$ element, $1 \leq j \leq M$, of the $k^{th}$ ordered set of intermediate values, $1 \leq k \leq N$, being a scalar product of the $k^{th}$ scaled first coefficient with the $j^{th}$ element of the $k^{th}$ ordered set of pre-computed factors;

cumulatively adding corresponding elements of the ordered sets of intermediate values, thereby to form an ordered set of N scaled second coefficients; and inversely applying the selected one of the magnification factor and the reduction factor to each element of the ordered set of scaled second coefficients, thereby to obtain the ordered set of second coefficients.

2. Computer-readable media as defined in claim 1, wherein applying the selected one of the magnification factor and the reduction factor includes bit shifting each first coefficient by a number of bits necessary to represent the selected one of the magnification factor and the reduction factor in base-2 arithmetic.

3. Computer-readable media as defined in claim 1, wherein each said ordered set is arranged in memory as a two-dimensional logical array.

4. Computer-readable media as defined in claim 1, wherein the first domain is a frequency domain and wherein the second domain is a color domain.

5. Computer-readable media as defined in claim 1, wherein M is equal to N and wherein the first coefficients are related to the second coefficients by an inverse discrete cosine transformation.

6. Computer-readable media as defined in claim 1, wherein each of the first coefficients occupies a first integer number of bits of memory and wherein each of the second coefficients occupies a second integer number of bits of memory less than the first integer number of bits of memory.

7. Computer-readable media as defined in claim 6, wherein each of the first coefficients occupies twelve of bits of memory and wherein each of the second coefficients occupies nine bits of memory.

8. Computer-readable media tangibly embodying a program of instructions executable by a computer to perform a method of transforming an ordered set of N first coefficients representative of a signal in a first domain into an ordered M set of M second coefficients representative of the signal in a second domain, the method comprising:

accessing an ordered set of N ordered sets of M pre-computed factors each, the $n^{th}$ ordered set of pre-computed factors, $1 \leq n \leq N$, being associated with the $n^{th}$ one of the first coefficients; and grouping the first coefficients into G groups of first coefficients, $1 < G < N$;

computing a set of G ordered sets of M intermediate values each the $j^{th}$ element, $1 \leq j \leq M$, of the $g^{th}$ ordered set of intermediate values, $1 \leq g \leq G$, being the cumulative sum of the scalar products of each first coefficient in the $g^{th}$ group of first coefficients with the $j^{th}$ element of the ordered set of pre-computed factors associated with that first coefficient;

cumulatively adding corresponding elements of the ordered sets of intermediate values, thereby to form the ordered set of second coefficients.

9. Computer-readable media as defined in claim 8, wherein computing a set of G ordered sets of M intermediate values includes:

determining a scaling factor associated with each $g^{th}$ group of first coefficients, $1 \leq g \leq G$;

applying the scaling factor associated with the $g^{th}$ group of first coefficients, $1 \leq g \leq G$, to each of the first coefficients in the $g^{th}$ group of first coefficients, thereby to obtain a $g^{th}$ group of scaled first coefficients;

computing a set of G ordered sets of M intermediate values each, the $J^{th}$ element, $1 \leq j \leq M$, of the $g^{th}$ ordered set of intermediate values, $1 \leq g \leq G$, being the cumulative sum of the scalar products of each scaled first coefficient in the $g^{th}$ group of scaled first coefficients with the $j^{th}$ element of the ordered set of pre-computed factors associated with the first coefficient corresponding to said scaled first coefficient;

inversely applying the scaling factor associated with the $g^{th}$ group of first coefficients, $1 \leq g \leq G$, to each of the elements of the $g^{th}$ ordered set of intermediate values, thereby to obtain a $g^{th}$ ordered set of de-scaled intermediate values; and cumulatively adding corresponding elements of the ordered sets of de-scaled intermediate values, thereby to obtain the ordered set of second coefficients.

10. Computer-readable media as defined in claim 8, wherein computing a set of G ordered sets of M intermediate values includes:

determining a scaling factor associated with each $g^{th}$ group of first coefficients, $1 \leq g \leq G$;

applying the scaling factor associated with the $g^{th}$ group of first coefficients, $1 \leq g \leq G$; to each of the first coefficients in the $g^{th}$ group of first coefficients, thereby to obtain a $g^{th}$ group of scaled first coefficients;

computing a set of G ordered sets of M intermediate values each, the $j^{th}$ element, $1 \leq j \leq M$, of the $g^{th}$ ordered set of intermediate values, $1 \leq g \leq G$, being the cumulative sum of the scalar products of each scaled first coefficient in the $g^{th}$ group of first coefficients with the $j^{th}$ element of the ordered set of pre-computed factors associated with the first coefficient corresponding to said scaled first coefficient:

determining a residual scaling factor common to all ordered sets of intermediate values and a normalizing factor associated with the $g^{th}$ ordered set of intermediate values, $1 \leq g \leq G$;

inversely applying the normalizing factor associated with the $g^{th}$ group of first coefficients, $1 \leq g \leq G$, to each of the elements of the $g^{th}$ ordered set of intermediate values, thereby to obtain a $g^{th}$ ordered set of normalized intermediate values; and cumulatively adding corresponding elements of the ordered sets of normalized intermediate values, thereby to obtain an ordered set of M residually scaled second coefficients; and inversely applying the residual scaling factor to each of elements of the ordered set of residually scaled second coefficients, thereby to obtain the ordered set of second coefficients.

11. Computer-readable media as defined in claim 10, wherein the steps of cumulatively adding corresponding elements of the ordered sets of normalized intermediate values and inversely applying the residual scaling factor include:

selecting a first one of the ordered sets of normalized intermediate values;

setting a base scaling factor to 2;

for each of the G-1 other ordered sets of normalized intermediate values, repeating the following steps (a) through (d):

(a) dividing by two the elements of the first ordered set of normalized intermediate values;

(b) dividing by the base scaling factor the elements of the other ordered set of normalized intermediate values;

(c) cumulatively adding on an element-by-element basis the results of (a) and (b); and (d) doubling the base scaling factor;

inversely applying an adjusted residual scaling factor to each of elements of the result of (c), wherein the adjusted residual scaling factor is the quotient of the residual scaling factor and the value of the base scaling factor immediately prior to the $G-1^{th}$ execution of step (c).

12. Computer-readable media as defined in claim 8, wherein grouping the first coefficients into G groups of first coefficients, $1<G<N$, includes grouping the first coefficients on a basis of a characteristic of each first coefficient.

13. Computer-readable media as defined in claim 12, wherein the characteristic of a first coefficient is a position of that first coefficient within the ordered set of first coefficients.

14. Computer-readable media as defined in claim 12, wherein the characteristic of a first coefficient is a magnitude of that first coefficient relative to a magnitude of each other first coefficient.

15. Computer-readable media as defined in claim 1, wherein both N and M are each equal to eight.

16. Computer-readable media tangibly embodying a program of instructions executable by a computer to perform a method of transforming an ordered set of N first coefficients representative of a signal in a first domain into an ordered set of M second coefficients representative of the signal in a second domain, the method comprising:

pre-computing an ordered set of N ordered sets of M pre-computed factors each, the $n^{th}$ ordered set of pre-computed factors, $1 \leq n \leq N$, being associated with the $n^{th}$ one of the first coefficients; and selecting one of a magnification factor and a reduction factor for applying to the ordered set of N first coefficients in order to avoid one of overflow and underflow during the transforming of the set of N first coefficients to the M second coefficients;

applying the selected one of the magnification factor and the reduction factor to each of the N first coefficients, thereby to obtain an ordered set of N scaled first coefficients:

computing a set of N ordered sets of M intermediate values each, the $j^{th}$ element, $1 \leq j \leq M$, of the $k^{th}$ ordered set of intermediate values, $1 \leq k \leq N$, being a scalar product of the $k^{th}$ scaled first coefficient with the $j^{th}$ element of the $k^{th}$ ordered set of pre-computed factors;

cumulatively adding corresponding elements of the ordered sets of intermediate values, thereby to form an ordered set of N scaled second coefficients; and inversely applying the selected one of the magnification factor and the reduction factor to each element of the ordered set of scaled second coefficients, thereby to obtain the ordered set of second coefficients.

17. Computer readable media tangibly embodying a program of instructions executable by a computer to perform a method of transforming an ordered set of N first coefficients representative of a signal in a first domain into an ordered M set of M second coefficients representative of the signal in a second domain, the method comprising:

accessing an ordered set of N ordered sets of M pre-computed factors each, the $n^{th}$ ordered set of pre-computed factors, $1 \leq n \leq N$, being associated with the $n^{th}$ one of the first coefficients;

pre-computing the $n^{th}$ ordered set of M pre-computed factors, $1 \leq n \leq N$, by transforming into the second domain an ordered set of M coefficients having zeros in all positions except for unity in the $n^{th}$ position; and computing the second coefficients as a function of the first coefficients and the ordered sets of pre-computed factors, wherein $N \geq 2$ and $M \geq 2$.

18. A graphics processing device operative for transforming successive ordered sets of N first coefficients representative of a video signal in a first domain into successive corresponding ordered sets of M second coefficients representative of the video signal in a second domain, comprising:

a processor adapted for:
providing an ordered set of N ordered sets of M pre-computed factors each, the $n^{th}$ ordered set of pre-computed factors, $1 \leq n \leq N$, being associated with the $n^{th}$ one of the first coefficients;

pre-computing each $n^{th}$ ordered set of M pre-computed factors, $1 \leq n \leq N$, by transforming into the second domain an ordered set of M coefficients having zeros in all positions except for unity in the $n^{th}$ position; and using each ordered set of N first coefficients and the N ordered sets of pre-computed factors to compute the corresponding ordered set of M second coefficients, wherein $N \geq 2$ and $M \geq 2$:

a memory for storing the ordered sets of pre-computed factors.

19. A graphics processing device as defined in claim 18, further comprising:

an input buffer adapted to receive, successively, the ordered sets of N first coefficients and further adapted to be readable by the graphics processing unit; and the graphics processing unit being further adapted to retrieve successive ones of the ordered sets of N first coefficients from the input buffer.

20. A graphics processing device as defined in claim 19, further comprising;

an output buffer adapted to be writable by the graphics processing unit, the graphics processing unit being further adapted to successively store each computed ordered set of second coefficients into the output buffer.

* * * * *

UNITED STATES PATENT AND TRADEMARK OFFICE
CERTIFICATE OF CORRECTION

PATENT NO. : 7,129,962 B1 Page 1 of 1
APPLICATION NO. : 10/104011
DATED : October 31, 2006
INVENTOR(S) : Jean-François Côté and Jean-Jacques Ostiguy It is certified that error appears in the above-identified patent and that said Letters Patent is hereby corrected as shown below:

column 6, line 26: "that" should be --than--
column 7, line 14: "extant" should be --existant--
column 12, line 38: "and" should be removed after the semi-colon
column 13, line 36: "twelve of bits" should be --twelve bits--
column 13, line 48: "and" should be removed after the semi-colon
column 13, line 52: there should be a comma after "each"
column 13, line 57: the word --and-- should be added after the semi-colon
column 14, line 4: "J" should be --j--
column 14, line 45: "and" should be removed after the semi-colon
column 14, line 51: "each of" should be --each of the--
column 15, line 36: "and" should be removed after the semi-colon
column 16, line 33: "and" should be removed after the semi-colon
column 16, line 38: the colon should be a semi-colon followed by --and--

Signed and Sealed this

Fourth Day of September, 2007

JON W. DUDAS
*Director of the United States Patent and Trademark Office*